United States Patent [19]

McClain

[11] 4,148,766

[45] * Apr. 10, 1979

[54] POLYMER DISPERSION PROCESS

[75] Inventor: Dorothee M. McClain, Cincinnati, Ohio

[73] Assignee: National Distillers and Chemical Corporation, New York, N.Y.

[*] Notice: The portion of the term of this patent subsequent to Apr. 24, 1996, has been disclaimed.

[21] Appl. No.: 824,874

[22] Filed: Aug. 15, 1977

[51] Int. Cl.$^2$ ............................ C08K 3/24; C08K 9/05
[52] U.S. Cl. ............................... 260/23 H; 260/23 ST; 260/23 AR; 260/23 X A; 260/23.7 A; 260/29.6 PM
[58] Field of Search ....... 260/23 H, 29.6 PM, 23 AR, 260/23 XA, 23 ST, 23.7 A

[56] References Cited

U.S. PATENT DOCUMENTS

| | | | |
|---|---|---|---|
| 2,653,919 | 9/1953 | Hunter | 260/23 H |
| 3,586,654 | 6/1971 | Lerman et al. | 260/2.5 B |

FOREIGN PATENT DOCUMENTS 88404  3/1972  German Democratic Rep.

Primary Examiner—James H. Derrington
Attorney, Agent, or Firm—Kenneth D. Tremain

[57] ABSTRACT

A process for forming dispersions of olefin polymers and copolymers using an alkali metal soap of higher carboxylic acids together with a water-soluble salt as the dispersing agent.

11 Claims, No Drawings

POLYMER DISPERSION PROCESS

This invention relates to rapid processes for forming dispersions of thermoplastic resins, particularly resins of high molecular weight, in aqueous dispersion systems comprising alkali metal soaps of higher carboxylic acids and water-soluble salts.

CROSS-REFERENCES

Reference is made to commonly assigned, concurrenty filed U.S. Applications Ser. Nos. 824,873; 824,875; 824,934; 824,935; and, 824,936, and commonly assigned U.S. Application Ser. No. 564,198 filed Apr. 1, 1975.

BACKGROUND OF THE INVENTION

A vast art now exists which relates to the production of aqueous dispersions and emulsions of thermoplastic resins from the corresponding monomer or monomers by the methods of emulsion polymerization. These polymerizations are customarily performed in the presence of a considerable volume of water which may contain colloidal protectors or stabilizers, emulsifying agents of various kinds, free radical polymerization initiators, activators and promoters added to modify the action of the initiator, chain transfer agents for regulating molecular weight, chelating agents to intercept and neutralize the effect of metallic ions, as well as certain organic solvents to lower the freezing point of the system and otherwise modify the polymerization. Many of the thermoplastic polymers produced in this way by dispersion of emulsion polymerization can also be converted to powders by such processes as coagulation, spray drying, etc.

In general, the design of a useful dispersion or emulsion polymerization system poses two different but interrelated problems:

(a) the polymerization itself, which, as a process taking place in two or more discrete phases, is often extremely sensitive to changes in conditions and impurities; and (b) the colloid system which is the end product of the polymerization and is often unstable, variable in its properties and difficult to reproduce. And when the solid polymer product is isolated, it characteristically contains, as impurities, small amounts of the various substances introduced to promote the polymerization and stabilize the colloid system. In addition, dispersion and emulsion polymerization processes typically require several to many hours for completion, and are thus distinctly slow processes. In particular, the art discloses (U.S. Pat. No. 3,534,009) that in the batch emulsion polymerization of ethylene and vinyl acetate, an extraodinarily long polymerization time is required to consume all the vinyl acetate monomer charged, and it is necessary to resort to other means to accomplish this objective, such as reduction of ethylene pressure and the addition of more free-radical promoter. In this respect emulsion polymerization processes are at a decided disadvantage relative to the continuous, high pressure bulk polymerization processes now used commercially for the manufacture of low density polyethylene and ethylene copolymers. These latter processes proceed at exceedingly rapid rates; for example in a typical low density polyethylene process, as carried out in a reactor of the type described in U.S. Pat. No. 3,756,996, the polymerization times are of the order of 35 to 45 seconds at a conversion of 12 to 20%, and the total time required to convert monomer(s) to finished polymer is about 10 minutes.

A further disadvantage of the dispersion and emulsion polymerization processes of the art is that they are as yet of no, or only limited applicability in the manufacture of several important thermoplastic resins of commerce. For example, when ethylene is polymerized in emulsion, polyethylene is produced at typical emulsion polymerization rates (1–7 hours), but it contains residues derived from the emulsifier and a relatively large low molecular weight fraction [G. J. Mantel et al, J. Appl. Polymer Sci., 9, 1797, 1807, (1965); 10, 81,1845 (1966)]. Emulsion polymerization is substantially of no utility in the polymerization of such monomers as propylene, higher alpha-olefins, and isobutylene, since these monomers do not produce high polymers by a radical mechanism. Much the same situation holds for the thermoplastic resins produced by polycondensation processes.

It has long been known that many low molecular weight polymers, e.g., various waxes and hydrocarbon resins, can be emulsified in water by first dissolving them in an organic solvent, then contacting the organic solution of the polymer with water in the presence of surface active agents and emulsifiers, and thereafter recovering the organic solvent. This basic process has also been extended to true high polymers. Thus a process is known (U.S. Pat. No. 3,347,811) for preparing aqueous dispersions of ethylene copolymers which comprises (a) dissolving the copolymer in a water-immiscible organic solvent of b.p. 40°–160° C.; (b) emulsifying the solution in a mixture of water and a dissolved surfactant of HLB number of at least 18; and (c) evaporating the organic solvent from the resulting emulsion.

Similarly it is known (U.S. Pat. No. 3,503,917) to prepare artificial latexes, e.g., of polyisobutylene-isoprene copolymer (butyl rubber) and ethylene-propylene rubber, by dissolving the preformed polymers in an organic solvent such as toluene, emulsifying the organic solution of the polymer in water in the presence of a surface active agent, and finally stripping the organic solvent. It is especially to be noted that these processes of the art for dispersion of true high polymers are by their very nature complicated, laborious and, above all, comparatively slow.

In recent years, however, a new simplified process (U.S. Pat. No. 3,422,049; U.S. Pat. No. 3,746,631) has been developed for making dispersions of high molecular weight thermoplastics in water, without the need for an organic solvent. In several important respects the new process differs from all other polymer dispersion processes of the art:

(1) It is a rapid process, requiring a residence time of about 15–20 minutes in its continuous version (U.S. Pat. No. 3,432,483), and operates at 115° C. to 300° C. in the presence of only water and a surfactant, for which reason it is often called the "water process". In view of the short contact time, it is therefore particularly advantageous to couple the water process with the above-mentioned, equally rapid, high pressure process for making polyethylene and ethylene copolymers; when this is done, dispersions of these polymers can be produced from monomers in overall process times of the order of a half-hour or less.

(2) However, prior to the present invention, only a very unique class of surfactants, certain block copolymers of ethylene oxide and propylene oxide, could be used to produce the dispersions.

(3) The particles produced are substantially all spherical, very fine, and tend to be of a narrow particle size range; low density polyethylene, for example, is converted to spherical particles having a number-average particle diameter of about 10 microns, and a weight average diameter of about 25 microns.

(4) Since the water-process does not require the use of an organic solvent, it avoids all the disadvantages associated with prior art processes requiring solvents, such as: solvent loss during processing with attendant air pollution; the fire hazard inherent in solvent usage, and the time and energy expended in dissolving a high polymer in a solvent, and in recovering and recycling the solvent. However, when it is desired to make dispersions of even finer particle size, i.e., particles of submicron diameter (U.S. Pat. No. 3,418,265), limited amounts of organic solvent are advantageously added in the water process, but in amounts of only 0.5 to 20 parts per 100 parts of the resin to be dispersed, amounts that are far less than those required to disperse the resin in the other processes of the prior art. Additionally, in another version of the water process (U.S. Pat. No. 3,522,036), limited amounts of a liquid vinyl monomer, e.g., styrene, may also be added to provide stable, film-forming aqueous latices of high molecular weight polyethylene. In still other variants it is possible to produce foamed particles (U.S. Pat. No. 3,472,801) or to incorporate certain colorants (U.S. Pat. No. 3,449,291) and pigments (U.S. Pat. No. 3,675,736) in the particles.

The above described fine powders are, by virtue of their small particle size, their narrow particle size range, and their spherical particle shape, unique states of matter which cannot readily be prepared by conventional procedures known to the art. However, as already pointed out above, a unique nonionic surfactant or dispersing agent is required, i.e., the aforesaid block copolymer of ethylene oxide and propylene oxide more fully described in U.S. Pat. No. 3,422,049 and sold under the trade name of Pluronics by BASF-Wyandotte Corp. Nevertheless, as experience has accumulated in the use of these nonionic dispersants, certain disadvantages have become apparent. The very fine particle size fraction they produce, e.g., the aforesaid 10 micron particle can present problems in certain situations:

(a) fractions comprising particles 10 microns or less in diameter are classified as "respirable dusts" and may present a health hazard if they escape into the work place air;

(b) in addition, these ultrafine fractions can at times cause problems in powder handling equipment because of plugging and blockage.

Although art related to the water-process (U.S. Pat. No. 3,586,654) does disclose that the particles produced by that dispersion process may be reformed into particles that are the same, larger, or smaller in diameter, this conversion involves two operations and it requires the use of such large amounts of Pluronic dispersant as to be relatively disadvantageous from an economic point of view. Consequently, it would be highly desirable to modify the water-process in such a manner as to be able to disperse thermoplastic resins into particles of any desired particle size in one operation, and to achieve this goal by using economically acceptable levels of dispersing agent (preferably up to about 15 pph of resin), i.e. by substituting a simple dispersion system comprised of readily available components and which obviates some, if not all, of the difficulties encountered with the Pluronic dispersants.

Moreover, increasing petroleum prices make it highly desirable, again for economic reasons, to eliminate, if possible the requirement for the petroleum-based Pluronic dispersants. Additionally, as disclosed in commonly assigned, copending application, Ser. No. 564,198, dealing with the simultaneous saponification and dispersion of ethylene-vinyl acetate copolymers, it appears that the Pluronic dispersants are quite sensitive to the presence of metallic salts. When the polymer to be dispersed contained 0.1% or more of sodium ion, the copolymer could not be dispersed to a fine particle size until the sodium ion content is reduced to less than 0.1%.

It is known in the art to employ soaps as emulsifying agents in the emulsion copolymerization of monomers such as styrene and butadiene to produce latices of synthetic rubber. It is further known that the dispersed or emulsified synthetic rubber particles may be coagulated by adding salt or salt and acid to the latices; in this way the rubber may be conveniently recovered as a rubbery crumb. Moreover, if desired, the particle agglomeration process may be arrested at an intermediate particle size by adding salt to the latex, and/or by forming a salt in situ by adding an acid and later a base. Rhines (U.S. Pat. No. 2,538,273), for example, shows that in this latter process, the amount of acid and/or salt necessary to increase particle size can be reduced by also adding an alcohol.

The processes of the present invention, however, differ fundamentally from these teachings of the art in the following important respects:

1. They relate to the dispersion of already-formed synthetic resins, principally and advantageously to those selected from the group of synthetic resins that cannot readily or conveniently be made by emulsion or dispersion polymerization of the respective monomer or monomers. The resin, for example, in the form of pellets or cubes supplied commercially, is dispersed in water at elevated temperatures and pressures, as disclosed in the aforesaid water-process, but in the presence of a combination of a soap and a salt as the dispersing system instead of a Pluronic surfactant. Thus the processes of the present invention lead to reduction in the size of resin particles, and not to the agglomeration of fine particles to larger particles. Further, when the resin being dispersed is a hydrocarbon polymer such as polyethylene, polypropylene, polybutene-1, etc, or a copolymer or ethylene containing up to about 15 weight percent of a polar monomer such as vinyl acetate, a soap alone, excepting certain lithium soaps of saturated fatty acids, as described in commonly assigned concurrently filed U.S. Pat. Application Ser. No. 824,875, is not effective in producing a dispersion.

2. They are dispersion processes wherein a soap and a salt must both be present simultaneously. This contrasts with the above-cited processes of the art in which a salt is added to cream or coagulate after a latex has been made by emulsion polymerization in the presence of a soap.

3. They are dispersion processes in which a soap made in situ, e.g. from a fatty acid and an alkali, in the presence of resin, water, and a salt, produces smaller particle sizes than performed soaps under the same conditions.

4. They represent dispersion processes in which an optimum salt concentration range can usually be discerned, below which the dispersion process fails altogether, and above which reduced yields of coarser particles are obtained.
5. They represent dispersion processes in which variables such as the nature of the resin, i.e., its composition and melt viscosity; the resin solids content, i.e., ratio of resin to water; nature of the soap, i.e., size of the fatty acid residue, the identity of the cation, and whether the soap is made in situ or added preformed; the concentration of the soap; and the concentration of the salt are interrelated with each other and especially with dispersion temperature selected. This dynamic system of variables is much more intricate in nature than latex coagulation processes of the art.

Processes for simultaneously dispersing and saponifying ethylene-vinyl acetate (EVA) copolymers to provide particulate hydrolyzed ethylene-vinyl acetate (HEVA) copolymers are known. In German Democratic Republic (DDR) Pat. No. 88,404, there is described a process for simultaneously dispersing and saponifying EVA copolymers employing sodium hydroxide or potassium hydroxide as the saponification agent and an alkyl sulfonate, an acyl derivative of N-methyltaurine, a higher fatty acid soap an alkaryl sulfonate or a nonionic surface-active agent derived from ethylene oxide as the dispersion agent.

The process described involves saponifying ethylene-vinyl acetate copolymers at elevated temperature and pressure including, as the final step, discharging the reaction mixture at the operating temperature and pressure directly into a quench vessel at atmospheric or subatmospheric pressure. The quench vessel contains water that is stirred during the discharge operation and the rate of discharge of the reaction mixture is regulated by means of a needle valve. Thus, the sudden release of the reaction mixture causing a portion of the reaction medium to vaporize apparently results in formation of the dispersion due to the atomizing effect of the needle valve. This patent also discloses the optional use of dispersants, but it is apparent from the data provided that such dispersants have only a secondary effect, the primary determinant of dispersion being the discharge of the hot reaction mixture to the quenching bath. From the particle size distribution data provided in the disclosure, it is clear that the presence of dispersing agent seems to favor smaller particles, but is not absolutely essential since comparable dispersions are obtained when dispersing agents are not present in the reaction mixture. There is no indication that a dispersion of the polymer occurs in the reaction mixture prior to discharge when dispersing agents are present but the data provided shows that, on discharge, a dispersion is produced in the presence or absence of dispersing agent. Attempts to obtain dispersions of saponified EVA using N-oleoylsarconsinate as dispersing agent by merely cooling the reaction mixture without the described discharge step of DDR No. 88,404 have not produced dispersions. Similarly, when arylsulfonate dispersants are employed in lieu of the sarcosinate, no dispersions are obtained when the reaction mixture is cooled. Thus, it must be concluded that dispersion only occurs on discharge.

The dispersed product obtained by the method of DDR No. 88,404 is of fairly large particle size, the heavy majority of the particles being of diameters greater than 0.125 mm, i.e. usually over 80% of the dispersed particles. In addition, the product is composed of irregular particles, with no spherical particles being observed.

In accordance with the present invention, desirable improvements are achieved by substituting dispersant systems comprising alkali metal soaps of higher carboxylic acids in conjunction with certain water-soluble salts for the unique Pluronic dispersing agents of U.S. Pat. Nos. 3,442,049 and 3,746,631.

The invention provides dispersing systems for dispersing high molecular weight polyolefins and copolymers of olefins in water at rapid rates and avoids the need for an organic solvent. The novel dispersing systems thus provided generally yield particles that are larger than those produced by the Pluronic dispersing agents of the art and afford a wider range of particle size than the Pluronic dispersants, without, however, requiring the use of large amonts of dispersant. Additionally, they practically eliminate the, at times objectionable ultrafine, 10-micron or less particle fractions present in powders produced by Pluronic dispersants.

In general, the present process can be carried out substantially as described in the basic water-process patent (U.S. Pat. No. 3,422,049), with the exception that the Pluronic surfactants of that process are replaced with dispersing agents comprising a soap of a higher carboxylic acid and a water-soluble salt.

Thus, in batch operation, the polymer, water (preferably distilled or deionized) and the dispersant system are introduced into a pressure vessel equipped with an external heater, a thermocouple, and a stirrer. The vessel is sealed, heated to 165°–300° C. and held at the sealed temperature for a brief period, usually 5–10 minutes, during which time rapid stirring is applied. Thereafter the heater is shut off and the vessel is allowed to cool with stirring, and optionally with externally-applied cooling for convenience. When the temperature of the contents of the vessel has fallen below about 100° C., the product is discharged, optionally diluted with additional deionized or distilled water, cooled to about room temperature, and filtered to collect the dispersed polymer. The filter cake is washed with cold water, preferably deionized or distilled, to remove contained water-soluble salt and the washings are combined with the mother liquor. The combined mother liquor and washings contain substantially all of the water-soluble salt, but very little of the soap. Normally a substantial proportion of the water is then removed by distillation and the residue, containing substantially all of the water-soluble salt, can be recycled.

For recovery of the soap, the filter cake is next washed with warm (70°–95° C.) water, preferably deionized or distilled. The soap collects in the wash water, leaving the dispersed resin substantially free of both water-soluble salt and soap. Alternatively the soap may be removed by treating with a suitable organic solvent, e.g., hot alcohol.

If separation of the recovered soap and salt are of no concern, the filter cake can be freed thereof by the mere expediency of water washing, preferably using warm water.

DESCRIPTION OF PREFERRED EMBODIMENTS

The substrate, i.e. the polymer to be dispersed, is a polymer or copolymer that is essentially of hydrocarbon character, or one that is of limited polarity, e.g., a polyolefin or olefin copolymer or copolymer of an olefin containing up to about 15 weight percent of a polar comonomer, e.g. vinyl acetate. The dispersant system is a soap, preferably formed in situ from a higher carboxylic acid and a base, in the presence of a water-soluble substantially neutral salt. A preformed soap may be substituted for the in situ soap, but the results are inferior in that some large relatively non-spherical particles are also formed. Further, when in situ soaps are employed, there is a strong tendency to produce particles of average diameter in the range of about 50 to about 100 microns. With preformed soaps, there is a tendency towards larger sized particles extending over a broad range.

Each of the components may be introduced independently and separately but it is also possible to combine two or more of the components before introduction into the dispersion vessel. For example, the water-soluble salt and the preformed soap, when used, are conveniently added in solution in part of the water used to produce the dispersion. Where in situ soaps are employed, the base introduced to neutralize the fatty acid may also be added in aqueous solution, either in a separate solution or in the same solution as the water-soluble salt. However, it is preferred not to add a preformed soap in the same solution as the water-soluble salt. The polymer itself may also be employed as a medium for introducing the other components. Thus, for example, where an in situ soap is desired, it is convenient to blend the acid into the polymer before introduction into the dispersion, and, where a pre-formed soap is employed, this, too, can be blended into the polymer prior to dispersion. Less commonly, the water-soluble salt is blended into the polymer before dispersion, either alone or in combination with the acid for making in situ soap. The practice of blending into the polymer, water-soluble salt, acid for in situ soap and base to make the in situ soap before dispersion is ordinarily not preferred.

As an alternative in situ soap formation, the soap can be formed from a glyceride or other ester by saponification with slightly more than the stoichiometrically required amount of base. The triglyceride or other higher carboxylic acid ester may be added directly to the dispersion vessel or previously blended into the polymer along with the other dispersion components.

The various embodiments of the invention may also be carried out as a continuous operation, in the manner described in U.S. Pat. No. 3,432,483. In such continuous operation the polymer to be dispersed is fed to the bottom of the dispersion vessel and the dispersion is removed at the top of the dispersion vessel. Separate lines supplying the various components of the dispersion enter the bottom of the vessel itself which can be provided with a pre-mixing zone. The components may be introduced separately or in combination as hereinbefore described.

In general the properties of the type of polymers dispersed are not significantly affected by the dispersion process although some small degree of saponification may occur.

Although it is more advantageous to employ the process to disperse high molecular weight polymers, that is to say polymers having a number average molecular weight of about 10,000 and above, this should not be understood as limiting the process to such polymers, since it is also within the scope of the invention to disperse polymers having a number average molecular weight below about 10,000 even as low as about 1000–1500. Mixtures of polymers may be dispersed.

The type of polymer that is dispersible by the process of the invention is not limited in any way as to method of synthesis. In general, however, the polymers selected will most often be made by free radical addition polymerization processes used commercially to manufacture low density polyethylene. Certain other dispersible polymers are made by Ziegler-Natta and Phillips polymerization processes, and even by low temperature cationic polymerization. Polymers made by various types of polycondensation may also be dispersed. Nor are the polymers that may be dispersed by the process of the invention limited as to the number of different repeat units that make up the chain molecules, or the order of their occurence. Included are homopolymers, random copolymers, alternating copolymers, block polymers and graft polymers.

Examples of the classes of polymers that are dispersible by this invention are the polyolefins, copolymers of two or more olefins, olefin-vinyl ester copolymers, ethylene-vinyl alcohol copolymers, olefin-acrylate ester copolymers, olefin-vinyl halide copolymers, olefin-fluoroolefin copolymers, ethylene-vinyl ester-vinyl alcohol terpolymers, olefin-vinyl ester-sulfur dioxide terpolymers, olefin-vinyl ester-carbon monoxide terpolymers, olefin-vinyl alcohol-carbon monoxide tetrapolymers and acrylate and methacrylate ester homo- and copolymers. Moreover, analogous styrenic homo- and copolymers, and fluoroplastics are also within the scope of the invention.

Specific examples are low, intermediate and high density polyethylene, polyropylene, polyisobutylene, poly(butene-1), poly (4-methylpentene-1), poly(ethylene-co-propylene); ethylene-propylene-non-conjugated diene terpolymers known as EPDM rubber, poly (isobutylene-co-isoprene), polystyrene, polyvinyl chloride, polyvinyl fluoride, polyvinylidene fluoride, poly (tetrafluoro-ethylene), poly (ethylene-co-vinyl chloride), poly (ethylene-co-vinyl acetate) containing up to about 15 weight percent vinyl acetate; poly (ethylene-co-methyl acrylate) and poly (ethylene-co-ethyl acrylate) containing up to about 15 weight percent of the acrylate ester; poly (styrene-co-acrylonitrile) with up to about 15 weight percent acrylonitrile; poly (ethylene-co-vinyl acetate-co-vinyl alcohol) containing up to about 15 percent of combined vinyl acetate and vinyl alcohol, poly (ethylene-co-vinyl acetate-co-sulfur dioxide or co-carbon monoxide) with up to about 15 weight percent of total monomer units other than ethylene, and poly (ethylene-co-vinyl acetate-co-vinyl alcohol-co-sulfur dioxide or co-carbon monoxide) also containing up to about 15 weight percent of monomer units other than ethylene.

The preferred soaps are soaps of alkali metals of atomic weight of at least 23, i.e. sodium, potassium, rubidium and cesium, and, of these, the more preferred are sodium and potassium because of the availability or ease of preparation, the most preferred being sodium which is most economical and practical.

As disclosed in commonly assigned, concurrently filed U.S. Patent Application Ser. No. 824,875, certain lithium soaps, i.e. soaps of higher saturated fatty acids, disperse the same thermoplastic resins as are employed in the present inventive process. However, the presence of the water-soluble salt, which is used along with the selected lithium soap in accordance with the present invention, affects the particle size distribution of the dispersed product and results in an increase in the number of particles within the desired size range.

The soaps for use in the present invention are known compounds, i.e. salts of higher hydrocarbon carboxylic acids with the alkali metals. The acid moiety of the soap can be saturated or unsaturated, most commonly ethylenically-unsaturated, linear or branched, and can be composed of a mixture of such acids, for example as is obtained by saponification of natural glyceride fats. Included in the term "higher carboxylic acid" as used in this invention are the so-called dimer acids made by dimerization of polyunsaturated linear fatty acids. The soap should not react adversely to any appreciable extent with the polymer substrate, i.e. should be substantially inert to the polymer. As employed herein, and in the appended claims, the term "soap" embraces the aforesaid salts of higher carboxylic acid.

The preferred higher carboxylic acid is a straight-chain $C_8$-$C_{22}$ monocarboxylic acid, which may be saturated or may contain one or more carbon-carbon double bonds per molecule, and may contain even or odd number of carbon atoms. Examples are caprylic acid, pelargonic acid, capric acid, undecanoic acid, lauric acid, tridecanoic acid, myristic acid, pentadecanoic acid, palmitic acid, margaric acid, stearic acid, nonadecanoic acid, arachidic (arachic) acid, heneicosanoic acid, behenic acid, 10-undecylenic acid, elaidic acid, oleic acid, erucic acid, brassidic acid, linoleic acid, and linolenic acid as well as mixtures of such acids, and dimer acids made by dimerization of polyunsaturated fatty acids, e.g. linolenic acids. Dimer acids are commercially available and contain 75-95% dimer, 4-25% trimer, and from a trace to 3% of monomeric polyunsaturated fatty acid.

Where a preformed soap is introduced, it will be a soap preparared by neutralization of one of the above disclosed acids or mixgures, with one or mixtures of the bases disclosed below or alternatively, commercially available fatty acid salts can be used.

When an in situ soap is employed, the soap is formed by reacting the fatty acid with an alkali metal hydroxide. Altrnatively, the corresponding bicarbonate or carbonate can be used. Examples of the alkali metal hydroxides that may be used are sodium hydroxide, potassium hydroxide, lithium hydroxide, rubidium hydroxide and cesium hydroxide; sodium bicarbonate and sodium carbonate; potassium bicarbonate and potassium carbonate; rubidium bicarbonate and rubidium carbonate; and cesium bicarbonate and carbonate may be substituted for the corresponding hydroxides. Mixtures of the said alkali metal compounds can be employed.

The water soluble salt is a substantially neutral salt. For the purpose of this invention, such a salt is defined as one that, at a 1.0 Molar concentration in pure water at 20° C. produces a solution, the pH of which has between 4 and 9. The cation of the salt is derived from an alkali metal or any other metal that does not form insoluble soaps with the above-disclosed acid selected, at the operating temperature of the process i.e., is inert to the soap employed. The cation may be monovalent, divalent or of higher valence. The nature of the anion of the salt does not appear to be critical; the anion can be for example, fluoride, chloride, bromide, iodide, bisulfate, sulfate, phosphate, hydrogen phosphate, dihydrogen phosphate, nitrate, bicarbonate, carbonate, acetate or propionate anion, or similar such anions. Mixtures of salts can be employed.

Specific examples of the water-soluble salts are lithium fluoride, lithium chloride, sodium bisulfate, sodium sulfate, sodium hydrogen phosphate, ammonium chloride, potassium dihydrogen phosphate, sodium carbonate, sodium acetate, sodium propionate, etc. The cation of the soap and the water-soluble salt may be the same or different.

It is usually preferred that the ratio of polymer to water range from about 0.1 to about 3 parts of polymer per part of water on a weight basis. Lower ratios are operable, but uneconomical, whereas higher ratios, though usable, present operational difficulties. The most preferred range is about 0.2 to about 0.65 parts of polymer per part of water on a weight basis. For in situ soap formation, the mole ratio of base to the amount of fatty acid may vary from about 1.0 to about 1.15 the preferred ratio is from about 1.05 to about 1.1. Lower ratios are operable, but may result in increased tackiness of the polymer due to solution of unneutralized fatty acid therein. Higher ratios are of no advantage. When base-sensitive, e.g., hydrolyzable, polymers are to be dispersed, excess base is preferably avoided where hydrolysis is not desired. The weight ratio of in situ fatty acid soap to polymer may vary from about 0.01 to about 0.3, the preferred ratio being from about 0.05 to about 0.15. The use of lower ratios of soap does not always result in the desired despersion of the polymer; higher ratios are generally unnecessary and therefore uneconomical. The preferred higher carboxylic acid is a preferably fatty acid, stearic acid. The preferred base for neutralization is sodium hydroxide.

The concentration of water-soluble salt in water may range from at least about 0.1 and up to about 15 weight percent, the preferred concentration being from about 1.0 to about 10 weight percent. Dispersions are not readily obtained at lower concentrations and higher concentrations are unnecessary. In addition, higher concentrations may tend to cause larger particle size. Thus there appears to be optimum salt concentration. Sodium chloride, sodium sulfate, and sodium acetate are the preferred water-soluble salts. These salts are preferred because hydrochloric acid, sulfuric acid, or acetic acid respectively, may then be used to convert recovered sodium stearate to stearic acid for recycle, when in situ sodium stearate is employed, while producing the same water-soluble salt used in the dispersion. Halide salts, particularly chlorides, though operable, are not preferred with stainless steel equipment because of the tendency to cause stress-corrosion cracking of the steel. A nickel alloy (Monel) is preferred for chloride service.

The dispersion temperature may range from about 100° to 350° C., but temperatures of from about 165° to about 300° C. are preferred. Dispersions are usually not readily obtainable at lower temperatures and higher temperatures are usually not required for successful dispersion. The pressure is autogenous. The rate of stirring should vary from about 2600 to about 4000 rpm with from about 3200 to about 3800 rpm being preferred, although stirring rates that are lower are at times sufficient. Higher stirring rates may be employed but usually are not advantageous. The dispersion times range from about 1 minute to about 1 hour; tomes of about 5 to 15 minutes are preferred.

The dispersions of the polymer substrate produced in accordance with the present invention are generally composed of particles, usually spherical, of an average diameter ranging from about 20 microns up to about 500 microns. With the preferred systems, the vast majority (70-90%) of the particles are less than 250 microns, a substantial majority of the particles being less than about 150 microns, usually ranging from about 20 to about 150 microns with most of the particles being in the range of about 50 to about 100 microns. As should be expected, the efficiency of the present dispersion process and the particle size of the dispersed product will vary to a certain extent with the selected soap and salt, the temperature, the amounts of reagents employed and other factors with which those skilled in the art are familiar.

The dispersion product as obtained can be used as such, or alternatively can be subjected to screening to isolate specific particle size product. Especially valuable are particles in the range of from about 40 to about 150 microns, which are especially useful for coating formation.

The relative molecular weights of the polymers of this invention are compared by means of their melt flow rates and/or their Mooney viscosities. Melt flow rate, abbreviated MFR, was determined according to ASTM D1238-65T, Condition B. In some cases Condition E of this procedure was used; such melt flow rates are called "melt indexes" herein. Mooney viscosities were determined according to ASTM D 1946. The polymers of this invention were also characterized by means of their vinyl acetate content. The vinyl acetate content was determined by a special saponification procedure involving the use of toluene as a solvent and ethanolic KOH solution as the saponifying agent. The results are reported as weight-percent vinyl acetate, abbreviated as "wt. % VA".

EXAMPLE I

Various metal salts of fatty acids are evaluated as to their dispersing properties using a polyethylene as the polymer substrate.

The dispersion experiments are performed in a cylindrical two-liter, four-inch diameter pressure reactor (Parr Instrument Company) equipped with a thermowell, a safety head, a stirrer bearing and shaft and a pressure gage. Power is supplied to the stirrer by means of a Bodine franctional horse-power motor having an output of 18,000 rpm (idling). The stirring propeller is either a conventional blade type (3 blades, 2 inch diameter) or a type comprising two carved-tooth turbine-type discs (3 inch diameter). To the pressure reactor is added 600 ml of distilled water, and the amount of polyethylene and soap indicated in Table I. The air is replaced with nitrogen and heat is applied until the temperature of the mixture reaches 200° C. at a pressure of 235 psig. Stirring is then started and continued at a rate of over 10,000 rpm for a period of 8 to 10 minutes. Stirring is then discontinued and the temperature of the reactor contents is allowed to drop under ambient cooling to about 90° C. The dispersion, where obtained, is diluted with an equal volume of water, and this mixture is filtered on a Buchner funnel fitted with a #41 H Whatman filter paper. The residue is washed thoroughly with water and dried for four hours at 60° C.

The results are given in Table I from which it is clear than only the lithium soaps of stearic acid and behenic acid provide good dispersions. In Table I, the terms "good" and "very good" indicate that a fine particle dispersion is obtained, i.e. that substantially all of the dispersed particles have a diameter of less than about 500 microns.

Table IA shows that other classes of anionic surfactants, like sodium stearate, also fail to disperse polyethylene when used alone. Included are a alkyl sulfates, alkyl sulfonates, alkylaryl sulfonates, sulfosuccinates, N-acylsarcosinates, and a fluoroalkyl phosphate. Evidently, under the recovery conditions of the present invention (cooling to below about 100° C.), anionic surfactants in general fail to disperse polyethylene, with the exception of lithium soaps.

Table IB (cationic surfactants) and Table IC (nonionic surfactants) illustrate that the said classes of surfactants are not effective in forming desired dispersions, as well.

TABLE I

DISPERSION OF POLYETHYLENE BY INDIVIDUAL SOAPS ALONE

Charge: 600 ml Deaerated Water
30 g Polyethylene /1/
12 g Soap Indicated

| Soap | Dispersion |
|---|---|
| Lithium Caprylate | None |
| Lithium Adipate | None |
| Lithium Oleate | 25% dispersed; particles >1000 microns |
| Lithium Stearate | Good |
| Sodium Stearate | None |
| Magnesium Stearate | None |
| Calcium Stearate | Very Little |
| Aluminum Stearate | None |
| Nickel Stearate | None |
| Zinc Stearate | Very little; particles >1000 microns |
| Lithium Erucate | 50% dispersed; particles >1000 microns |
| Lithium Behenate | Very Good |
| Sodium Behenate | None |
| Calcium Behenate | Very Little |
| Nickel Behenate | None |

/1/ PETROTHENE ® NA 202, a low density (0.915 g/cm$^3$) polyethylene resin of melt index 22 produced by U.S. Industrial Chemicals Co. for injection molding.

TABLE 1 A

ANIONIC SURFACTANTS THAT ALONE FAIL TO DISPERSE POLYETHYLENE

Charge: 600 ml of deaerated water
30 g polyethylene /1/
12 g surfactant

| Trade Name | Manufacturer or Source | Chemical Nature |
|---|---|---|
| Sodium lauryl sulfate | Laboratory Supply House | sodium salt of lauryl half ester of sulfuric acid |
| Triton X-200 | Rohm and Haas Co. | sodium salt of alkylaryl polyether sulfonate |
| Siponate DS-10 | Alcolac, Inc. | sodium dodecyl benzene sulfonate |
| Emcol K-8300 | Witco Chemical Corp. | complete aliphatic sulfonate |
| Benax 2A-1 | Dow Chemical Co. | disodium, 4-dodecylated oxydibenzene sulfonate acid |
| Aerosol TR | American Cyanamid Co. | Bis(tridecyl) ester of sodium sulfosuccinic acid |
| Tamol SN | Rohm and Haas Co. | sodium salt of condensed naphthalene sulfonic acid |
| Zonyl 5-11 CG 3875 | E.I. duPont deNemours | fluoroalkyl phosphate |
| Sarcosine L | Ciba-Geigy Corp. | N-lauroylsarcosine /2/ |

TABLE 1 A-continued

ANIONIC SURFACTANTS THAT ALONE FAIL TO DISPERSE POLYETHYLENE

Charge: 600 ml of deaerated water
30 g polyethylene /1/
12 g surfactant

| Trade Name | Manufacturer or Source | Chemical Nature |
|---|---|---|
| Sarcosine LC | Ciba-Geigy Corp. | N-cocoylsarcosine /2/ |
| Sarcosine O | Ciba-Geigy Corp. | N-oleoylsarcosine /2/ |

/1/ Petrothene NA 202 polyethylene
Carefully neutralized before use

TABLE 1 B

CATIONIC SURFACTANTS THAT ALONE FAIL TO DISPERSE POLYETHYLENE

Charge: 600 ml of deaerated water
30 g polyethylene /1/
12 g surfactant

| Trade Name | Manufacturer or Source | Chemical Nature |
|---|---|---|
| Katapol PN-430 | GAF Corp. | Polyoxyethylated alkylamine |
| Priminox R-1M | Rohm and Haas Co. | Reaction product of primene 81-R (a 12–14 carbon amine) with 1 mole of ethylene oxide |
| Priminox T-1M | Rohm and Haas Co. | Reaction product of Primene IM-T (an 18–22 carbon amine) with 1 mole of ethylene oxide |
| Wilimid 513 | Wilson and Martin Co. | A fatty acid-derived cyclic amine, a water-dispersible dark liquid |
| Wilimid 513DO | Wilson and Martin Co. | neutralization product of Wilmid 513 and an oleic-type acid, a water dispersible dark liquid |

/1/ Petrothene NA 202 Polyethylene

TABLE 1 C

NONIONIC SURFACTANTS TESTED ALONE FOR DISPERSION OF POLYETHYLENE

Charge: 600 ml deaerated water
30 g polyethylene /1/
12 g surfactant

| Trade Name | Manufacturer or Source | Chemical Nature | HLB No | Dispersion |
|---|---|---|---|---|
| Siponic L-12 | Alcolac Chemical Corp. | Ethoxylated lauryl alcohols | — | none |
| Siponic L-25 | " | " | 17.12 | none |
| Siponic E-3 | " | Ethoxylated tallow alcohols | — | none |
| Siponic E-4 | " | " | — | none |
| Decosanol | Eastman Kodak Co. | C-22 alcohol | — | none |
| Poly-Tergent J-200 | Olin Corp. | Polyethoxyethyl aliphatic ether | — | none |
| Poly-Tergent J-300 | " | " | none | |
| Emulphor CN-870 | GAF Corp. | Polyoxyethylated fatty alcohol | — | none |
| Emulphogene BC-420 | " | Tridecyloxypoly (ethyleneoxy) ethanol | — | none |
| Triton X-67 | Rohm and Haas Co. | Ethoxylated fatty alcohol | 16.73 | particles of ~1 mm diameter formed |
| Brij 98 | ICI, Atlas Chemical Div. | Polyoxyethylene (20) oleyl ether | 15.3 | none |
| Surfynol 485 | Air Products and Chemicals, Inc. | Ethoxylated(30 moles)tetramethyl decynediol | — | none |
| Triton X-45 | Rohm and Haas Co. | Octylphenoxy polyethoxy ethanol | — | none |
| Triton X-405 | " | " | — | none |
| Igepal CO-210 | GAF Corp. | nonylphenoxypoly(ethyleneoxy)ethanol | — | none |
| Igepal CO-430 | " | " | — | none |
| Igepal CO-530 | " | " | — | none |
| Igepal CO-880 | " | " | 17.14 | some subdivision /2/ |
| Igepal DM-880 | " | Alkylphenoxypoly(ethyleneoxy)ethanol | — | some subdivision /2/ |
| Igepal RC-520 | " | " | — | none |
| Renex 20 | ICI, Atlas Chemical Div. | Polyoxyethylene ester of mixed fatty acid resin acids | 13.8 | none |
| Priminox R-15 | Rohm and Haas Co. | RNH(CH$_2$CH$_2$O)$_{15}$H | — | none |
| Pluronic P-105 | BASF-Wyandotte Corp. | Block copolymer of ethylene oxide and propylene oxide | 15.0 | 500 - micron particles |
| Pluronic F-77 | " | " | 24.5 | large particles |
| Pluronic F-108 | " | " | 27.0 | fine (10-micron) particles |
| Pluronic F-98 | " | " | 27.5 | fine (10-micron) particles |
| Pluronic F-38 | " | " | 30.5 | none |

/1/ Petrothene Na 202 polyethylene
/2/ Dispersed portion not finely divided

EXAMPLE 2

The procedure of Example 1 was repeated, employing sodium stearate as the dispersing agent (Table 2, Exp. 1), and in a parallel experiment a water-soluble, substantially neutral salt was also provided as part of the dispersing system, the particular salt selected being sodium chloride (Table 2, Exp. 2). It was found that in agreement with Example 1, no dispersion of polyethylene was produced with sodium stearate alone, whereas a dispersion was obtained when sodium chloride was present along with sodium stearate as the dispersing system.

It should be noted that the polymer solids level in Table 2 is about 9 weight percent, based on polymer and water, and is lower than desirable for commercial operation.

TABLE 2
EFFECT OF SODIUM CHLORIDE ON THE DISPERSION OF POLYETHYLENE IN THE PRESENCE OF SODIUM STEARATE

Charge 600 ml. Deaerated, distilled water
60 g. PETROTHENE NA 202 Polyethylene
12 g. Sodium stearate
(NaCl as indicated)

| Exp. No. | NaCl, g | Percent Recovery as Powder | Weight Percent of Particles having a Particle Size (Microns) of: |  |  |  |  |
|---|---|---|---|---|---|---|---|
| | | | <53 | 53–105 | 105–210 | 210–500 | >500 |
| 1 | None | None | No dispersion | | | | |
| 2 | 24 | 83 | 2.8 | 20.0 | 49.8 | 26.3 | 1.0 |

EXAMPLE 3

In this example the sodium stearate-sodium chloride dispersant system of Example 2 is employed to disperse polyethylene and ethylene-vinyl acetate copolymers at polymer solids levels of 25–35 weight percent and at slower stirrer speeds. The experiments are performed in a Parr Instrument Company Monel Metal pressure reactor of 1-liter capacity, and equipped with a stirrer comprising two carved-tooth turbine type discs. The stirrer is rotated by a drill press driven by a 1 horsepower d.c. motor. The dispersion operation is carried out substantially as described in Example 1, except that the maximum stirring speed was in the range of 2800–3800 rpm's. The dispersion period is seven minutes and the maximum temperature is 235° C. when ethylene vinyl acetate copolymers are dispersed. After the dispersion period is over, the reactor is rapidly cooled externally with dry ice to about 90° C., and the contents diluted with water. The dispersed material is recovered by filtration, washed with water, dried and sieved. The results are in Table 3A and 3B.

The experiments in Table 3A and 3B compare both preformed sodium stearate and in-situ sodium stearate, in the absence and in the presence of added sodium chloride. The polymer solids levels are 25–35 weight percent (based on water and polymer), which are substantially higher than the solids levels of Example 2 and equivalent to about what would be used in commercial production. From Table 3A and 3B it is evident that, in the presence of sodium chloride, preformed sodium stearate dispersed both polyethylene (Experiment 1) and ethylene-vinyl acetate (Experiment 5). In situ sodium stearate also dispersed polyethylene (Experiment 3) and ethylene-vinyl acetate (Experiment 7) in the presence of sodium chloride. When the sodium chloride was omitted, however, neither polyethylene nor ethylene-vinyl acetate gave a dispersion with preformed sodium stearate (Experiments 2 and 6 respectively). With in situ sodium stearate, but no sodium chloride, polyethylene also gave no dispersion. (Experiment 4)

In situ sodium stearate yielded finer particles than preformed sodium stearate, for both polyethylene and ethylene-vinyl acetate, with nearly all the particles having diameters below about 150 microns (Experiments 3 and 7). Preformed sodium stearate yields substantial amounts of material having diameters above 150 microns (Experiments 1 and 5). Stearate systems typically yield very little material with diameters below 20 microns (data not shown in Tables 3A and 3B).

TABLE 3A
Effect of Sodium Chloride on Particle Size Distribution in the Dispersion of Polyethylene and Ethylene-Vinyl Acetate Copolymer with Preformed and In Situ Sodium Stearate

| Exp. No. | Resin | | | | | | Preformed Sodium Stearate g. | In Situ Sodium Stearate | |
|---|---|---|---|---|---|---|---|---|---|
| | Type (1) | Percent Vinyl Acetate | Melt Index, g/10 min | g. | Water ml. | NaCl, g. | | Stearic Acid, g. | NaOH, g. |
| 1 | polyethylene | — | 22.0 | 210 | 390 | 24.0 | 13.65 | — | — |
| 2 | polyethylene | — | 22.0 | 210 | 390 | — | 13.65 | — | — |
| 3 | polyethylene | — | 22.0 | 210 | 390 | 24.0 | — | 12.6 | 1.75 |
| 4 | polyethylene | — | 22.0 | 210 | 390 | — | — | 12.6 | 1.75 |
| 5 | ethylene-vinyl acetate | 9.0 | 9.36 | 150 | 450 | 17.5 | 15.00 | — | — |
| 6 | ethylene-vinyl acetate | 9.0 | 9.4 | 150 | 450 | — | 15.00 | — | — |
| 7 | ethylene-vinyl acetate | 9.0 | 9.36 | 150 | 450 | 17.5 | — | 13.9 | 1.95 |

(1) The polyethylene was PETROTHENE ® NA 202, the ethylene-vinyl acetate copolymer was ULTRATHENE ® UE 635. Both are produced by U.S. Industrial Chemicals Co.

TABLE 3B

| Exp. No. | Percent Dispersed | Weight Percent of Particles Having Particle Size (Microns) of | | | | | | | | |
|---|---|---|---|---|---|---|---|---|---|---|
| | | <37 | 37–53 | 53–75 | 75–105 | 105–149 | 149–177 | 177–250 | 250–420 | >420 |
| 1 | 90 | 0.1 | 1.0 | 3.5 | 5.8 | 8.2 | 4.1 | 9.5 | 16.1 | 51.7 |
| 2 | No dispersion | — | — | — | — | — | — | — | — | — |
| 3 | 100 | 2.5 | 15.0 | 41.5 | 20.8 | 17.9 | 1.1 | 0.8 | 0.4 | — |
| 4 | No dispersion | — | — | — | — | — | — | — | — | — |
| 5 | 95+ | 2.4 | 12.4 | 18.3 | 13.9 | 13.2 | 6.1 | 8.3 | 7.9 | 17.4 |
| 6 | No dispersion | — | — | — | — | — | — | — | — | — |
| 7 | 100 | 14.3 | 24.5 | 23.7 | 18.1 | 16.4 | 2.3 | 0.4 | 0.1 | Trace |

EXAMPLE 4

In the manner described in Example 3, polyethylene is dispersed in water with the in situ sodium stearate-sodium chloride dispersant system, at different levels of sodium stearate but at constant sodium chloride concentration. The results of these experiments are shown in Table 4. It is apparent that, under the specific conditions of the experiments in Table 4, substantially all of the particles are below 150 microns in diameter. The diameters below about 150 microns. The principal effect of greater-than-stoichiometric amounts of sodium hyroxide is to favor binodal particle size distribution.

TABLE 5

Effect of NaOH/Stearic Acid mole ratio on the dispersion of Polyethylene at constant salt concentration.

Charge: 210 g Polyethylene /1/
390 ml Water
24 g Sodium Chloride

| | In Situ Sodium Stearate /2/ | | | | Particle Size Distribution, Diameters in Microns, Weight % | | | | | | | | |
|---|---|---|---|---|---|---|---|---|---|---|---|---|---|
| Exp. No. | Stearic Acid g. | NaOH g. | Mole Ratio, NaOH to Stearic Acid | % Dispersed | <37 | 37–53 | 53–75 | 75–105 | 105–149 | 149–177 | 177–250 | 250–420 | 420–840 | >840 |
| 5-1 | 12.6 | 5.0 | 2.86 | 100 | 5.6 | 26.42 | 22.98 | 17.24 | 26.35 | 0.55 | 0.45 | 0.20 | 0.13 | — |
| 5-2 | 12.6 | 2.5 | 1.43 | 100 | 3.9 | 17.50 | 32.93 | 19.84 | 15.06 | 8.68 | 1.59 | 0.39 | 0.11 | — |
| 5-3 | 12.6 | 1.75 | 1.00 | 100 | 2.3 | 15.00 | 41.55 | 20.84 | 17.90 | 1.09 | 0.85 | 0.42 | — | — |

/1/ PETROTHENE® NA 202; U.S. Industrial Chemicals Co.
/2/ Calc. sodium stearate: 6.48 pph of polyethylene threshold amount of in situ sodium stearate for producing a dispersion lies between 3.24 and 4.32 pph of the polyethylene. Even at 4.32 pph of in situ sodium stearate there is slight trend toward particles of greater than 150 microns. At the higher sodium stearate levels however, there is no marked differences in particle size distribution.

EXAMPLE 6

A series of experiments are carried out as described in Example 3, wherein the sodium chloride level is varied at the lowest useful in situ sodium stearate concentration shown in Table 4, i.e. at 4.32 pph of in situ sodium stearate, based on the polyethylene. As indicated by the

TABLE 4

EFFECT OF SODIUM STEARATE (IN SITU) LEVEL ON PARTICLE SIZE DISTRIBUTION IN DISPERSION OF POLYETHYLENE

Charge: 210 g. Polyethylene /1/
390 ml. Water
24 g. NaCl

| | In Situ Sodium Stearate | | | | Particle Size Distribution, Diameter in Microns, Weight % | | | | | | | | |
|---|---|---|---|---|---|---|---|---|---|---|---|---|---|
| Exp. No. | Stearic Acid, g. | NaOH, g. | Sodium Stearate (Calc.) pph /2/ | Percent Dispersed | <53 | 53–75 | 75–105 | 105–149 | 149–177 | 177–250 | 250–420 | 420–840 | >840 |
| 4-1 | 16.8 | 2.33 | 8.65 | 100 | 11.41 | 38.28 | 22.65 | 25.03 | 1.13 | 0.68 | 0.62 | 0.2 | — |
| 4-2 | 12.6 | 1.75 | 6.48 | 100 | 17.35 | 41.55 | 20.84 | 17.90 | 1.05 | 0.85 | 0.42 | — | — |
| 4-3 | 8.4 | 1.17 | 4.32 | 100 | 11.03 | 32.80 | 19.24 | 27.26 | 5.45 | 2.61 | 0.87 | 0.7 | — |
| 4-4 | 6.3 | 0.875 | 3.24 | (no dispersion) | | | | | | | | | |

/1/ PETROTHENE® NA 202; U.S. Industrial Chemicals Co.
/2/ Based on polyethylene.

EXAMPLE 5

As described in Example 3, polyethylene is dispersed in water with the in situ sodium stearate-sodium chloride dispersant system, but, in individual experiments, 1.00, 1.43 and 2.86 moles of sodium hydroxide were added per mole of stearic acid. The sodium chloride concentration was held constant and equal to that used for polyethylene in Example 3 and 4. The results obtained in the three experiments appear in Table 5. again, substantially all the powder is made up of particles with results reported in Table 6, increasing the sodium chloride level in the charge beyond 24 g, or 11.5 pph based on polyethylene, had the effect of broadening the particle size distribution with a shift to larger particles size and a decrease in the amount of resin dispersed. These results provide evidence for the existence of an optimum salt concentration range for the dispersion process. At zero salt concentration there is no dispersion (Experiment 6-1) and at 32 g of salt (Experiment 6-5) there is again evidence for failure of the dispersion process, i.e. decreased yield.

TABLE 6

Evidence for optimum salt concentration in the dispersion of polyethylene with in situ sodium stearate Charge: 210 g Polyethylene /1/
390 ml water
8.4 g Stearic acid } 9.05 g. sodium sterate (calc.)
1.17 g NaOH

| | Sodium | | Particle Size Distribution, Diameter in Microns, Weight % | | | | | | | | |
|---|---|---|---|---|---|---|---|---|---|---|---|
| Exp. No. | Chloride g | Percent Dispersed | <53 | 53–75 | 75–105 | 105–149 | 149–177 | 177–250 | 250–420 | 420–840 | >840 |
| 5-1 | None | None | — | — | — | — | — | — | — | — | — |
| 6-2 | 16 | 92.6 | 3.51 | 28.75 | 25.26 | 24.48 | 6.06 | 6.06 | 2.93 | 2.93 | — |
| 6-3 | 24 | 100.0 | 11.33 /2/ | 32.80 | 19.24 | 27.26 | 5.49 | 2.61 | 0.87 | 0.40 | — |
| 6-4 | 28 | 99.0 | 9.77 | 13.19 | 13.93 | 12.83 | 7.82 | 16.98 | 9.04 | 12.89 | 3.54 |

TABLE 6-continued

Evidence for optimum salt concentration in the dispersion of polyethylene with in situ sodium stearate Charge: 210 g Polyethylene /1/
390 ml water
8.4 g Stearic acid  } 9.05 g. sodium sterate (calc.)
1.17 g NaOH

| Exp. No. | Sodium Chloride g | Percent Dispersed | Particle Size Distribution, Diameter in Microns, Weight % |||||||||
|---|---|---|---|---|---|---|---|---|---|---|---|
| | | | <53 | 53–75 | 75–105 | 105–149 | 149–177 | 177–250 | 250–420 | 420–840 | >840 |
| 6-5 | 32 | 63.0 | 6.8 | 13.6 | 13.9 | ← | 21.9 | → | 13.2 | 14.6 | 15.8 | /3/ |

/1/ PETROTHENE® NA 202; U.S. Industrial Chemicals Co.
/2/ Coulter Counter analysis of the less-than-53 micron fraction gave the following: 37–53 microns, 7.33%; 32–37 microns, 0.80%; 25.4–32 microns, 2.52%; 20.2–25.4 microns, 0.63%; 16.0–20.2 microns, 0.13%; 12.7–6.0 microns, 0.02%.
/3/ A total of 42.6 g of polymer was recovered as pieces >840 microns and 35 g additional material was considered undispersed.

EXAMPLE 7

The procedure of Example 3 is repeated with polyethylene and in situ sodium stearate to compare the effectiveness of different salts on the dispersed product. The results are given in Table 7.

The bulk of the dispersed polymer lies in the 50–150 micron range for the higher levels of sodium chloride, sodium sulfate and sodium acetate.

TABLE 7

EFFECT OF VARIOUS WATER SOLUBLE SALTS ON PARTICLE SIZE OF POLYETHYLENE /1/ DISPERSED WITH IN-SITU SODIUM STEARATE

| Polymer Amt. g. | Water Amt. g. | Na-Stearate Amt. g. /2/ | Salt Formula | Amt. g. | Dispersion Temp. °C. | Recovery Percent | Particle Appearance | Particle Size Distribution Weight Percent-Microns |||||||
|---|---|---|---|---|---|---|---|---|---|---|---|---|---|
| | | | | | | | | <38 | 38–53 | 53–100 | 100–149 | 149–250 | 250–420 | >420 |
| 210 | 390 | 13.6 | NaCl | 24 | 185 | 100 | Mostly spherical | 2.0 | 12.7 | 72.8 | 11.7 | .8 | — | — |
| " | " | " | NaC$_2$H$_3$O$_2$ | 16 | " | " | Some spheres, needles | — | 5.3 | 37.6 | 13.3 | 27.1 | 8.4 | 9.3 |
| " | " | " | " | 24 | " | " | Mostly spherical | 1.1 | 9.1 | 69.8 | 15.8 | 4.2 | — | — |
| " | " | " | Na$_2$SO$_4$ | 16 | " | " | Some spheres, needles | — | 3.4 | 29.8 | 18.7 | 15.5 | 8.9 | 23.7 |
| " | " | " | " | 24 | " | " | Mostly spherical | .3 | 5.4 | 56.6 | 23.3 | 13.8 | .6 | — |

/1/ Petrothene NA 202; U.S. Industrial Chemicals Co.
/2/ In-situ; from 12.6 g. stearic acid and 1.75 g. of NaOH

EXAMPLE 8

This example illustrates the dispersion of a linear polyethylene in water employing as the dispersing system in situ sodium stearate and sodium chloride. The linear polyethylene used was LS 630, an injection molding grade resin produced by U.S. Industrial Chemicals Co. It has a melt index of 28 and a density of 0.962 g/cc. The dispersion was performed as described in Example 3. To the reactor was added 150 g of LS 630 polyethylene, 450 ml of deionized water, 18 g of stearic acid, 2.78 g of sodium hydroxide (for in situ sodium stearate), and 24.0 g of sodium chloride. The dispersion was made at 200° C. Upon cooling to below about 100° C., the dispersed LS 630 was recovered by filtration, washed, and dried. The yield of dispersed material was 90%. Microscopic examination showed that the particles were spherical. Screen analysis gave the following particle size distribution:

| | |
|---|---|
| 19.2 wt. % | <106 microns |
| 43.4 wt. % | 106–149 microns |
| 37.4 wt. % | 149–250 microns |
| trace | 250–420 microns |

EXAMPLE 9

This example illustrates the dispersion of polypropylene in water by means of a dispersing system consisting of in situ sodium stearate and sodium chloride. The polypropylene was Shell Carlona P, Grade SY-6100, a resin of melt index 10–14 that was supplied by Shell Canada, Ltd., Toronto. The dispersion was carried out as described in Example 3. To the reactor was added 150 g Shell Carlona P polypropylene, 450 ml of deionized water, 18 g of stearic acid, 2.78 g sodium hydroxide (for in situ sodium stearate), and 24.0 g of sodium chloride. The dispersion was made at 235° C., at a stirring rate of 2400 rpm. Upon recovery, after cooling to below about 100° C., it was found that only 50% of the polypropylene charged was dispersed. Microscopic examination showed that the particles were spherical. Screen analysis of the particles gave the following distribution:

| | |
|---|---|
| 47.0 wt % | <106 microns |
| 50.1 wt. % | 106–149 microns |
| 2.9 wt. % | 149–250 microns |
| — | >250 microns |

EXAMPLE 10

The procedure of Example 3 was repeated employing, however, the disodium salt of a dimerized fatty acid as the soap. To the autoclave was charged 390 g. of deionized water, 210 g. of PETROTHENE NA 202 polyethylene, 24 g. of sodium chloride, 1.75 g. of sodium hydroxide, and 12.6 g. of Hystrene 3695, a dimer acid supplied by Humko Sheffield Chemical, an operation of Kraftco Corp., Hinsdale, Ill. Hystrene 3695 contains 95% dimer acid, 4% trimer acid, and 1% monomer acid. The dispersion was performed at 185° C. at a stirring rate of 3700 rpm. Upon cooling, the autoclave was opened and it was found that 100% of the polyethylene had been dispersed to a fine powder, of which substantially all the particles were found to be spherical upon microscopic examination. This experiment demonstrates that even a dibasic acid can be used to disperse a high polymer if the soap thereof is prepared in situ in the presence of sodium chloride.

What is claimed is:

1. A process for dispersing an olevin polymer containing from 0 up to about 15% polar comonomer which comprises agitating said polymer in molten state in an aqueous dispersion system comprising an alkali metal soap together with a water-soluble substantially neutral salt inert to said soap and cooling said system with the polymer in the disperse state to below about 100° C.

2. Process according to claim 1 wherein said soap is formed in situ.

3. Process according to claim 1 wherein said dispersion system comprises an alkali metal soap of a saturated fatty acid containing from about 8 to about 22 carbon atoms.

4. Process according to claim 1 wherein said salt comprises an alkali metal salt.

5. Process according to claim 1 wherein said soap comprises an alkali metal stearate.

6. Process according to claim 5 wherein said salt comprises an alkali metal salt.

7. Process according to claim 1 wherein the polymer comprises an ethylene polymer.

8. Process according to claim 1 wherein the polymer comprises an ethylene-vinyl acetate copolymer.

9. Process according to claim 1 wherein the weight ratio of polymer to water in said dispersion system is from about 0.1:1 to about 3:1; the weight ratio of soap to polymer is from about 0.01:1 to about 0.3:1; and the salt is present at from about 0.1 to about 15% based on the weight of water.

10. A process according to claim 1 wherein said dispersion system comprises an alkali metal soap of a dimerized polyunsaturated fatty acid.

11. A process according to claim 1 wherein said soap comprises sodium stearate.

* * * * *